United States Patent
Meekes (10) Patent No.: US 8,598,882 B2
(45) Date of Patent: Dec. 3, 2013

(54) METHOD OF MONITORING A HYDROCARBON RESERVOIR

(75) Inventor: Jozef Antonius Chrysostomus Meekes, Soest (NL)

(73) Assignee: Nederlandse Organisatie Voor toegepast-natuurwetenschappelijk Onderzoek TNO (NL)

( * ) Notice: Subject to any disclaimer, the term of this patent is extended or adjusted under 35 U.S.C. 154(b) by 138 days.

(21) Appl. No.: 13/321,393

(22) PCT Filed: May 19, 2010

(86) PCT No.: PCT/NL2010/050295
§ 371 (c)(1),
(2), (4) Date: Feb. 2, 2012

(87) PCT Pub. No.: WO2010/134807
PCT Pub. Date: Nov. 25, 2010

(65) Prior Publication Data
US 2012/0126816 A1    May 24, 2012

(30) Foreign Application Priority Data
May 19, 2009    (EP) .................................... 09160667

(51) Int. Cl.
*G01V 3/02* (2006.01)
*G01V 3/18* (2006.01)
*G01V 3/20* (2006.01)
*G01V 3/22* (2006.01)

(52) U.S. Cl.
USPC ........... 324/355; 324/347; 324/354; 324/357; 324/366

(58) Field of Classification Search
USPC ........................................................ 324/355
See application file for complete search history.

(56) References Cited

U.S. PATENT DOCUMENTS

| | | |
|---|---|---|
| 1,863,542 A | 6/1932 | Nichols et al. |
| 2,211,124 A | 8/1940 | Jakosky |
| 2,288,973 A | 7/1942 | Neufelf et al. |
| 2,708,261 A | 5/1955 | Thompson |
| 3,690,164 A | 9/1972 | Gabillard et al. |
| 4,875,015 A | 10/1989 | Ward |
| 5,537,045 A | 7/1996 | Henderson |
| 5,767,860 A | 6/1998 | Zimmer et al. |
| 5,914,603 A | 6/1999 | Daily et al. |

FOREIGN PATENT DOCUMENTS

GB    2284062 A    5/1995

OTHER PUBLICATIONS

International Search Report for PCT/NL2010/050295 dated Aug. 16, 2011.

*Primary Examiner* — Bot Ledynh
(74) *Attorney, Agent, or Firm* — Banner & Witcoff, Ltd.

(57) ABSTRACT

A method of monitoring an extent of a hydrocarbon reservoir (2) below the earth's surface (4), includes the steps of applying a current between a bottom current electrode (6) and a top current electrode (8) that is part of a plurality of electrodes that are spaced apart from one another along a part of the earth's surface located above and optionally over the hydrocarbon reservoir. The bottom current electrode is positioned below the hydrocarbon reservoir. The method includes the step of measuring an electrical potential, which is caused by the current, by means of a measurement electrode (10A) that is also part of the plurality of electrodes. The method includes the step of inferring from the measured electrical potential the extent of the hydrocarbon reservoir, in a direction that is oriented substantially parallel with the earth's surface.

17 Claims, 5 Drawing Sheets

METHOD OF MONITORING A HYDROCARBON RESERVOIR

CROSS-REFERENCE TO RELATED APPLICATIONS

This application is a U.S. National Stage application under 35 U.S.C. §371 of International Application PCT/NL2010/050295 (published as WO 2010/134807 A1), filed May 19, 2010, which claims priority to Application EP 09160667.3, filed May 19, 2009. Benefit of the filing date of each of these prior applications is hereby claimed. Each of these prior applications is hereby incorporated by reference in its entirety.

The invention relates to a method of monitoring an extent of a hydrocarbon reservoir, containing naturally formed hydrocarbons, below the earth's surface.

Usually, optimisation of production from a subsurface hydrocarbon reservoir is a complicated task. One of the main reasons for this complexity is the inherent lack of knowledge about the situation and processes within and near the hydrocarbon reservoir. Such lack of knowledge for example complicates making decisions on drillings of wells, or makes estimates of future production possibilities less accurate. For making such decisions or estimates, or for performing other aspects of production optimisation, it is important to know the extent of the hydrocarbon reservoir before and during production. This for example indicates possible well positions and is an important factor for estimating future production possibilities.

A hydrocarbon reservoir usually extends generally parallel to the earth's surface, has an elongated shape, and extends in two longitudinal directions that are transverse to one another along the elongated reservoir. The extent of the hydrocarbon reservoir transversely of these longitudinal directions in a thickness direction of the hydrocarbon reservoir (e.g. in a substantially vertical direction, such as along the oil column) is often known from wellbore logs. However, a lateral extent of the hydrocarbon reservoir along these longitudinal directions is often unknown. Accordingly there is a need for a method to monitor, both before and after production has started, the extent of the hydrocarbon reservoir along its mutually transverse longitudinal directions. In addition, such an extent can change as a result of hydrocarbons being moved and being replaced by other pore fluids such as water, caused by the production.

Inspection of the earth's subsurface is often carried out by means of seismic methods. Seismic methods are suitable for recognising various geologic layers in the earth's subsurface, and have proven to be valuable in discovery of hydrocarbon reservoirs. Seismic methods have also been applied to monitoring reservoir depletion in time, often referred to as 4-D seismics. In 4-D seismics, an extent of the reservoir is determined repeatedly by using seismic methods. However, seismic methods are known to be sometimes less accurate. In addition, 4-D seismic determination of the extent of the hydrocarbon reservoir requires extensive and repeated field surveying, and computationally intensive numerical computations, and is therefore relatively costly to carry out.

It is therefore an objective of the present invention to provide a method for monitoring an extent of a hydrocarbon reservoir that meets one or more disadvantages of the known methods.

Accordingly, the invention provides a method of monitoring an extent of a hydrocarbon reservoir below the earth's surface, including the steps of: a) applying a current between a bottom current electrode and a top current electrode that is part of a plurality of electrodes that are spaced apart from one another along a part of the earth's surface located adjacent to the hydrocarbon reservoir, and above and optionally over the hydrocarbon reservoir, wherein the bottom current electrode is positioned below the hydrocarbon reservoir; b) measuring an electrical potential, which is caused by the current, by means of a measurement electrode that is also part of the plurality of electrodes; and c) inferring from the measured electrical potential the extent of the hydrocarbon reservoir, in a direction that is oriented substantially parallel with the earth's surface.

It was realised that pore fluids in a hydrocarbon reservoir, such as oil, and pore fluids around hydrocarbon reservoirs, such as water, have a relatively large difference in their electrical properties, such as electrical conductivity and resistivity. Water has a relatively large electrical conductivity, and hydrocarbons such as oil have a relatively low electrical conductivity. The hydrocarbon reservoir, as a result, can be regarded as a body of relatively low electrical conductivity. Usually, significant amounts of salt are dissolved in the water around the hydrocarbon reservoir, which further increases its electrical conductivity.

Because of the relatively low conductivity, i.e. a relatively high electrical resistivity, of the hydrocarbon reservoir, in combination with the bottom current electrode being positioned below the hydrocarbon reservoir, the current will predominantly flow around the hydrocarbon reservoir. Flow of the current from the bottom current electrode to the top current electrode, or from the top current electrode to the bottom current electrode, is thus resisted by the hydrocarbon reservoir. The hydrocarbon reservoir usually extends, at least partly, in the direction that is oriented generally parallel with the earth's surface. Thus, in passing around the hydrocarbon reservoir, the current will flow in the direction that is oriented substantially parallel with the earth's surface. Such flow will lead to a specific gradient in a potential field along the part of the earth's surface. It will thus be clear that this potential field depends on the extent of the hydrocarbon reservoir in the direction that is oriented substantially parallel with the earth's surface. Thus, by measuring the electrical potential, the extent of the hydrocarbon reservoir in the direction that is oriented substantially parallel with the earth's surface can be inferred.

Because of the relatively low conductivity of the hydrocarbon reservoir, it can be understood that the potential field along the part of the earth's surface will change significantly if the extent of the hydrocarbon reservoir changes, which contributes to the sensitivity of the method.

In addition, carrying out steps a), b), and/or c) can be less costly than carrying out a seismic measurement.

Electrical measurement of a vertical extent of the hydrocarbon reservoir in a thickness direction of the hydrocarbon reservoir is known from U.S. Pat. No. 5,767,680. However, in U.S. Pat. No. 5,767,680 the measuring electrode is located in the wellbore at the depth of the hydrocarbon reservoir. Such placement of the measuring electrode in the wellbore is more expensive than placing the measuring electrode along the part of the earth's surface. In addition, placement of the measuring electrode and the bottom current electrode as proposed in U.S. Pat. No. 5,767,680 is not suitable for monitoring the extent of the hydrocarbon reservoir in the direction that is oriented substantially parallel with the earth's surface.

The electrodes of the plurality of electrodes are spaced apart from one another along the part of the earth's surface, which is indicated to be located above the hydrocarbon reservoir. The part of the earth's surface being located above the hydrocarbon reservoir does not require that the part of the earth's surface is located over the hydrocarbon surface. The part of the earth's surface is considered to be located over the hydrocarbon surface if an imaginary straight line that extends from the earth's surface perpendicular to the earth's surface, can reach the hydrocarbon reservoir.

When in this description the bottom current electrode is indicated to be positioned below the hydrocarbon reservoir, then this means that an imaginary straight line that extends from a position on the earth's surface perpendicular to the earth's surface, and reaches the bottom current electrode, also extends through the hydrocarbon reservoir. It is further noted that the term 'positioned below the hydrocarbon reservoir' also refers to positions that correspond with a lower portion of the hydrocarbon reservoir. In that case, the imaginary straight line has not extended completely through the hydrocarbon reservoir when it reaches the bottom current electrode.

It will be clear that the terms 'below' and 'above' are used in the normal sense for a human observer that stands with his feet on the part of the earth's surface.

Often, rock of the hydrocarbon reservoir contains oil. At the edge of the hydrocarbon reservoir, the oil is in contact with water contained in rock pores in a transition zone, which is usually referred to as the oil-water contact. As a result, the extent of the hydrocarbon reservoir, in the direction that is oriented substantially parallel with the earth's surface, is often limited by the oil-water contact. Therefore, preferably, inferring the extent of the hydrocarbon reservoir as in step c) may be performed by inferring the position of the oil-water contact.

Inferring in step c) can be carried out in various ways. It will be clear to the skilled person that, as the electrical potential is influenced by the extent of the hydrocarbon reservoir, such inferring in general is possible. Preferably, a computer is used for inferring in step c). Preferably, inferring in step c) includes carrying out forward and/or inverse modelling of at least steps a) and b).

It is noted that when the expression monitoring is used, this may relate to measuring or determining the potential at one moment in time, or may relate to a plurality of measurements at distinct moments in time.

It is further noted that for any combination of two current and two measurement electrodes the current and measurement electrodes can be interchanged. An electrode that forms the measurement electrode thus alternatively can be used as the top current electrode, and the electrode that forms the top current electrode can be used as the measurement electrode. Without wanting to be bound by any theory, such interchanging may be possible because of the principle of reciprocity that may be valid in the situation of a method according to the invention.

In an embodiment, step b) includes measuring the electrical potential, which is caused by the current, by means of a pair of electrodes. One electrode of the pair may be the measurement electrode of the plurality of electrodes and another electrode of the pair may be a reference electrode. Alternatively, both electrodes of the pair may be measurement electrodes that are part the plurality of electrodes. The reference electrode may be shared by more than one of the measurement electrodes, for example all measurement electrodes of the plurality of electrodes.

It will be clear to the skilled person that measuring the potential may involve measuring a potential difference. The pair of electrodes may be used for measuring the potential difference.

In an embodiment, inferring in step c) is further based on a position of the top current electrode, a position of the measurement electrode, and/or a position of the bottom current electrode. It will be clear that the electrical potential will vary along at least the part of the earth's surface, above and adjacent to the hydrocarbon reservoir. Hence, it is advantageous to use the position of the measurement electrode for inferring the extent of the hydrocarbon reservoir in the direction that is oriented substantially parallel with the earth's surface (i.e. a lateral extent). It will also be clear that the measured electrical potential depends on the position of the top current electrode and the bottom current electrode. Hence, it is advantageous to use the position of the top current electrode and/or the position of the bottom current electrode for inferring the extent of the hydrocarbon reservoir in the direction that is oriented substantially parallel with the earth's surface. Preferably, inferring in step c) is further based on a position of the top current electrode, a position of the measurement electrode, and a position of the bottom current electrode.

In an embodiment, step a) includes applying the current between the bottom current electrode and a first subset of the plurality of electrodes, which first subset includes the top current electrode. The first subset may include further top current electrodes that are similar to the top current electrode. Preferably, the first subset includes at least two electrodes, more preferably at least ten electrodes. Using more than one electrode of the plurality of electrodes for applying the current towards or from the bottom current electrode, may enable increasing the sensitivity of the potential field for changes in the lateral extent of the hydrocarbon reservoir. Preferably, a total number of measurement electrodes in the second subset, and/or their positions along the part of the earth's surface, is chosen and/or adapted based on a shape and size of the hydrocarbon reservoir. Preferably, a mutual distance between the electrodes of the second subset is in a range from 20 to 200 meter. Preferably, inferring in step c) is further based on positions of electrodes of the first subset.

In an embodiment, step b) includes measuring a set of electrical potentials that includes the electrical potential, by means of a second subset of the plurality of electrodes, which second subset includes the measurement electrode, wherein step c) includes inferring from the set of measured electrical potentials the extent of the hydrocarbon reservoir. The second subset may include further measurement electrodes that are similar to the measurement electrode. Preferably, the second subset includes at least two electrodes, more preferably at least ten electrodes, in particular at least one hundred electrodes. In this way, a potential distribution over the part of the earth's surface can be measured. The electrodes of the second subset together can give information on the extent of the hydrocarbon reservoir in a plurality of directions that are oriented substantially parallel with the earth's surface. As a result, a shape and/or size of the hydrocarbon reservoir in a plane that is oriented substantially parallel with the earth's surface, can be determined.

In an embodiment, inferring in step c) is further based on positions of electrodes of the second subset. This embodiment enables inferring in step c) to be based on an electrical potential map determined from the set of measured electrical potentials and the positions of the electrodes of the second subset. Such a map may enable the generation of a comprehensive view of the shape and/or size of the hydrocarbon in the plane that is oriented substantially parallel with the earth's surface.

In an embodiment, the method includes the step of: d) repeating steps a) and b), wherein the top current electrode during a repetition of steps a) and b) was previously used as the measurement electrode; wherein inferring in step c) is based on the electrical potentials measured in steps b). In this way, tomography can be carried out. Preferably, steps a) and b) are repeated until all electrodes of the plurality of electrodes are used at least once as the top current electrode. It is not excluded that the method includes the step of: repeating steps a) and b), wherein the top current electrode during a repetition of steps a) and b) was a different one than the top current electrode previously used, i.e. during an earlier time of carrying out step a) and b); wherein inferring in step c) is based on the electrical potentials measured in steps b).

In an embodiment, the measurement electrode is located over an edge region of the hydrocarbon reservoir. The inventor discovered that in the edge region a change in the potential as a result of a change in the lateral extent of the hydrocarbon reservoir, is relatively large. The edge region may for example extent from the edge of the hydrocarbon reservoir in the direction that is oriented substantially parallel with the earth's surface over a distance equal to 300%, 100%, or 50% of a depth of the reservoir.

In an embodiment, the method further includes the step of: e) carrying out a numerical simulation of steps a) and b) by using a geo-electrical model, which is based on electrical properties of a first region of the earth in and around the hydrocarbon reservoir, and of a second region of the earth from the second region up to the earth's surface, wherein the geo-electrical model includes at least a simulated extent of the hydrocarbon reservoir as an input parameter, and includes at least a simulated electrical potential along the simulated earth's surface as an output parameter; wherein inferring in step c) includes matching the simulated electrical potential and the electrical potential measured in step b), by, optionally iterated, adapting of the simulated extent of the hydrocarbon reservoir in the numerical simulation, or of parameters of other relevant bodies in the subsurface, and further includes determining the extent of the hydrocarbon reservoir from the simulated extent of the hydrocarbon reservoir. Such a method yields an accurate determination of the extent of the hydrocarbon reservoir. In this method, inferring in step c) may be based on a position of the top current electrode, a position of the measurement electrode, and a position of the bottom current electrode. Such positions can be used as input for the numerical simulations.

In one embodiment, the method includes carrying out the combination of steps a) and b) a plurality of times, and further includes the step: f) monitoring the development of the extent of the hydrocarbon reservoir in time. This embodiment has a specific significance because it enables measuring changes in the potentials measured in steps b). Such changes may be predominantly related to changes in the lateral extent of the hydrocarbon reservoir due to hydrocarbon production. These changes in the lateral extent of the hydrocarbon reservoir may be more accurately determined than the extent of the hydrocarbon reservoir as such, as they are not influenced by any inhomogeneities in the subsurface. Such inhomogeneities influence each measurement of the potential equally, and will thus not influence the changes in the potentials. Preferably, in this embodiment inferring in step c) is further based on the changes in the measured electrical potentials in steps b).

The method of this last embodiment can form an alternative for seismic 4-D imaging. The electrodes may, in a time interval that includes the plurality of times, be left in place at their positions along the part of the earth's surface. This further reduces cost of the method, and also enables monitoring with a short sampling time.

In another embodiment, the method includes carrying out the combination of steps a), b), and c) a plurality of times, wherein monitoring in time in step f) is based on the extents inferred in steps c).

In an alternative embodiment, the method includes carrying out step d) before step c) each time step c) is carried out. In this way the tomographic method can be repeated.

In a further embodiment, the plurality of electrodes are spaced apart from one another in a grid along the part of the earth's surface. This enables accurate determination of the shape and/or size of the hydrocarbon in the plane that is oriented substantially parallel with the earth's surface.

Preferably, an optimal position of the measurement electrode is determined by forward modelling using the geo-electrical model.

In a still further embodiment, step a) includes application of a direct current and/or a time-varying current. In this way, a signal-to-noise ratio of the measured potential can be increased.

According to a particular aspect of the invention, the method is applied for monitoring progress of a steam flood in a tar sand and/or a water flood in an oil reservoir or to any other sobsurface production process that incorporates fluids and/or gasses that have a contrast in electrical conductivity compared to the surrounding pore fill.

The invention will now be illustrated, in a non-limiting way, with reference to the accompanying figures, wherein.

Unless stated otherwise, like reference numerals refer to like elements throughout the drawings.

Figure 1A:
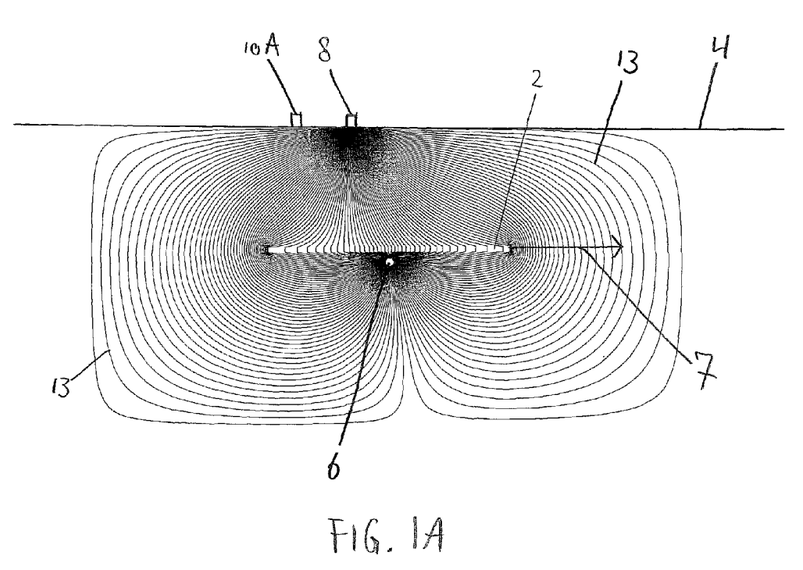
FIGS. 1A and 1B show a hydrocarbon reservoir below the earth's surface, in a cross-sectional view of a portion of the earth.
Figure 1B:
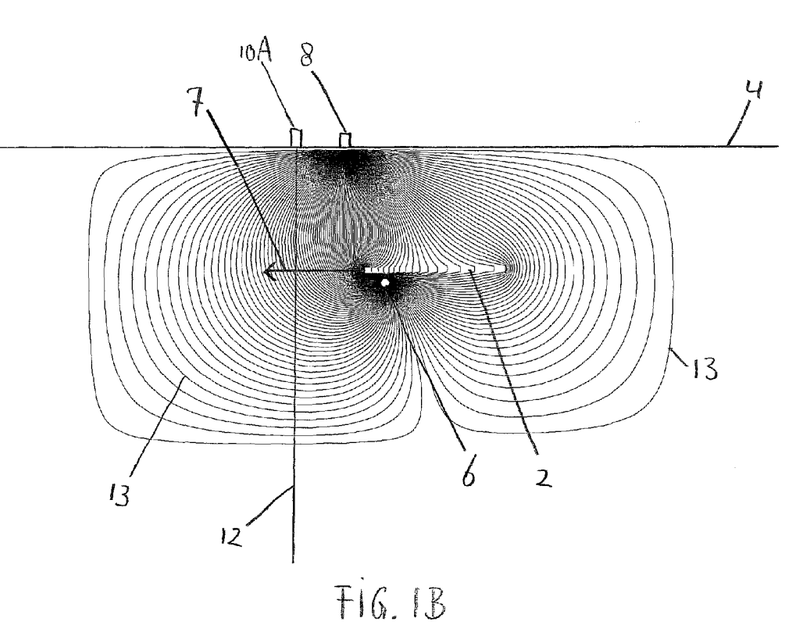

FIGS. 1A and 1B show a hydrocarbon reservoir 2 below the earth's surface 4, in a cross-sectional view of a portion of the earth. More in general, it is noted that a hydrocarbon reservoir includes natural porous rock with naturally formed hydrocarbons in its pores. In FIGS. 1A and 1B, a bottom current electrode 6 is positioned below the hydrocarbon reservoir 2. A longitudinal direction of the hydrocarbon reservoir 2 is indicated with arrow 7.

In FIG. 1A, a top current electrode 8 is located above and over the hydrocarbon reservoir 2 and a measurement electrode 10A is located above and over the hydrocarbon reservoir 2. The measurement electrode 10A and the top current electrode 8 are part of a plurality of electrodes that are spaced apart from one another along a part of the earth's surface 4. The earth's surface can be formed by land, by water such as a sea or a lake, or by submerged land such as a sea bottom. The plurality of electrodes being spaced apart from one another along the part of the earth's surface may include that the plurality of electrodes are positioned under the part of the earth's surface, e.g. at a depth that is much smaller than a depth of the reservoir, and/or may include that the plurality of electrodes are partly located on top of the part of the earth's surface. In this example, the top current electrode 8 and the measurement electrode 10A form the plurality of electrodes, which is located over the hydrocarbon reservoir 2. The top current electrode 8 may be separate from the measurement electrode 10A.

FIG. 1B shows a situation wherein part of the hydrocarbon of the reservoir 2 has been produced. As a result, a lateral extent of the reservoir has changed, i.e. has become smaller.

In FIG. 1B, the measurement electrode 10A is positioned above the hydrocarbon reservoir but is not anymore positioned over the hydrocarbon reservoir, as an imaginary straight line 12 that extends from the earth's surface 4, perpendicular to the earth's surface 4, cannot reach the hydrocarbon reservoir 2. As a result, the plurality of electrodes that is formed by the top current electrode 8 and the measurement electrodes 10A is located above the hydrocarbon reservoir 2 but not over the hydrocarbon reservoir 2.

Figure 3A:
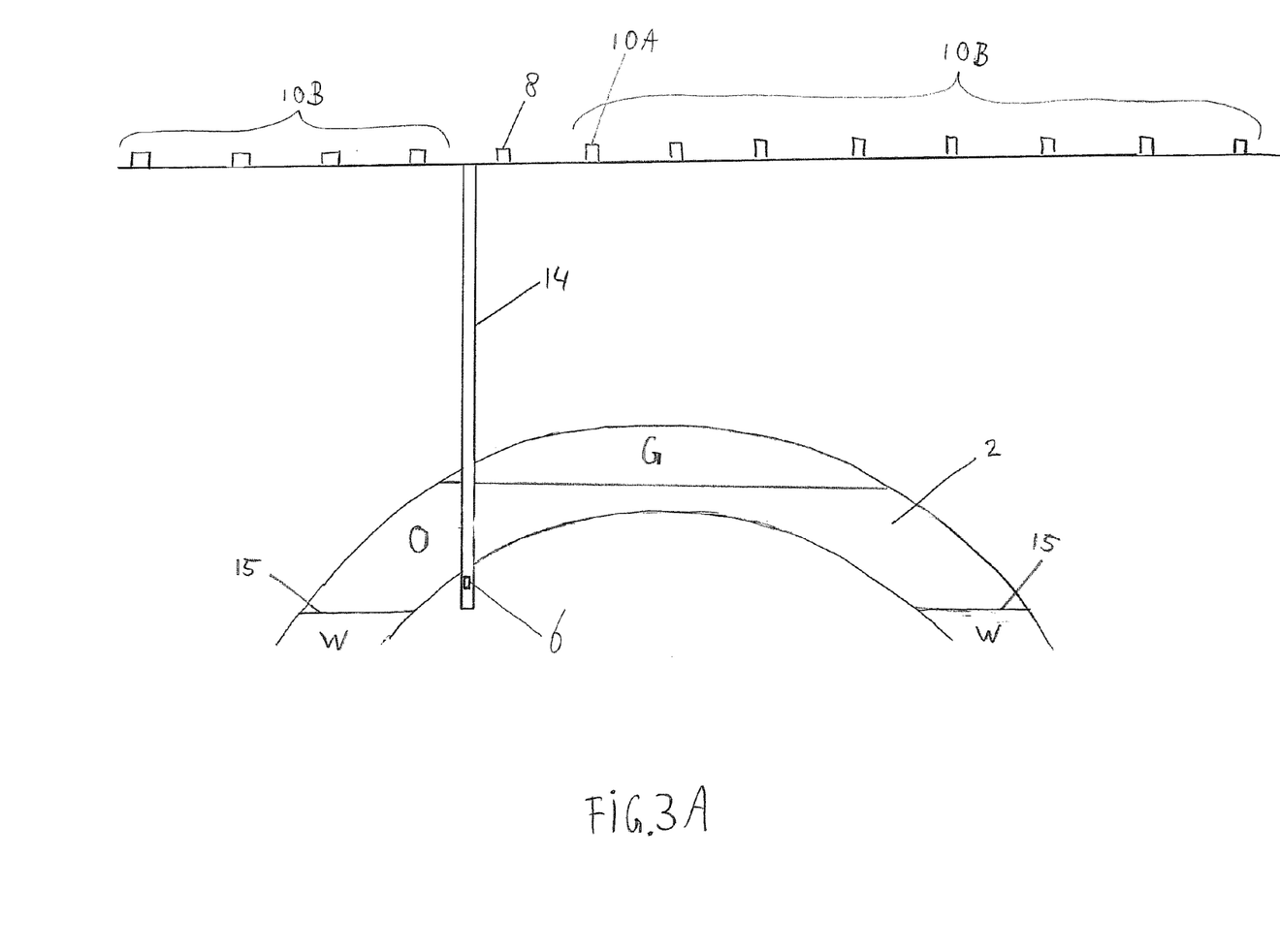
FIG. 3A shows a reservoir, a bottom current electrode, a wellbore, and a plurality of electrodes in a cross-sectional view of a portion of the earth.
Figure 3B:
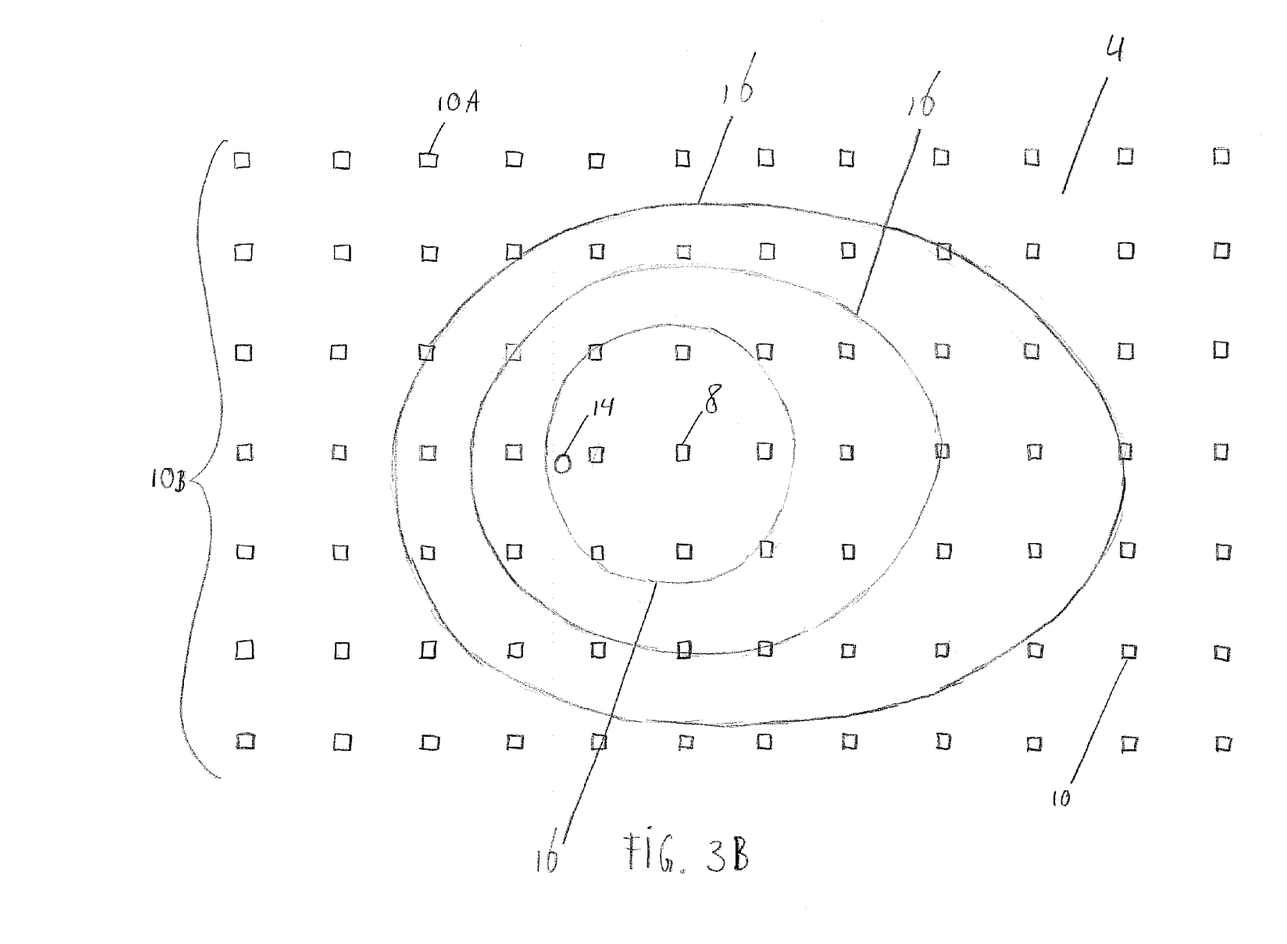
FIG. 3B shows a wellbore and a plurality of electrodes in a top view of a part of the earth's surface.

A first embodiment of a method according to the invention (further referred to as the first method), includes the step of applying a current between the bottom current electrode 6 and the top current electrode 8 of the plurality of electrodes that are spaced apart from one another along the part of the earth's surface 2. This electrical current can run via a portion of the earth from the top current electrode 8 to the bottom current electrode 6, or can run via a portion of the earth from the bottom current electrode 6 to the top current electrode 8. The current can be a direct current or can be an alternating current. Current lines of the current are indicated in FIGS. 1A and 1B with reference numeral 13. Equipotential surfaces may be defined perpendicular to these current lines. It will be clear that applying the current may require that the top current electrode 8 and the bottom current electrode 6 are electrically connected via an electrical connection, for example via a conductive cable through a wellbore, and/or via a conductive casing in the wellbore. The wellbore is not shown in FIGS. 1A and 1B, but is shown in FIGS. 3A and 3B with reference numeral 14.

The first method further includes the step of measuring an electrical potential, which is caused by the current, by means of the measurement electrode 10A. Although this example is explained by referring to only one measurement electrode 10A, it may be clear that in other examples further measurement electrodes may be employed in a similar way as the measurement electrode 10A is employed in this example. The measured electrical potential relates to a value of a potential field at a position of the measurement electrode 10A, which potential field is caused by the current.

Figure 2A:
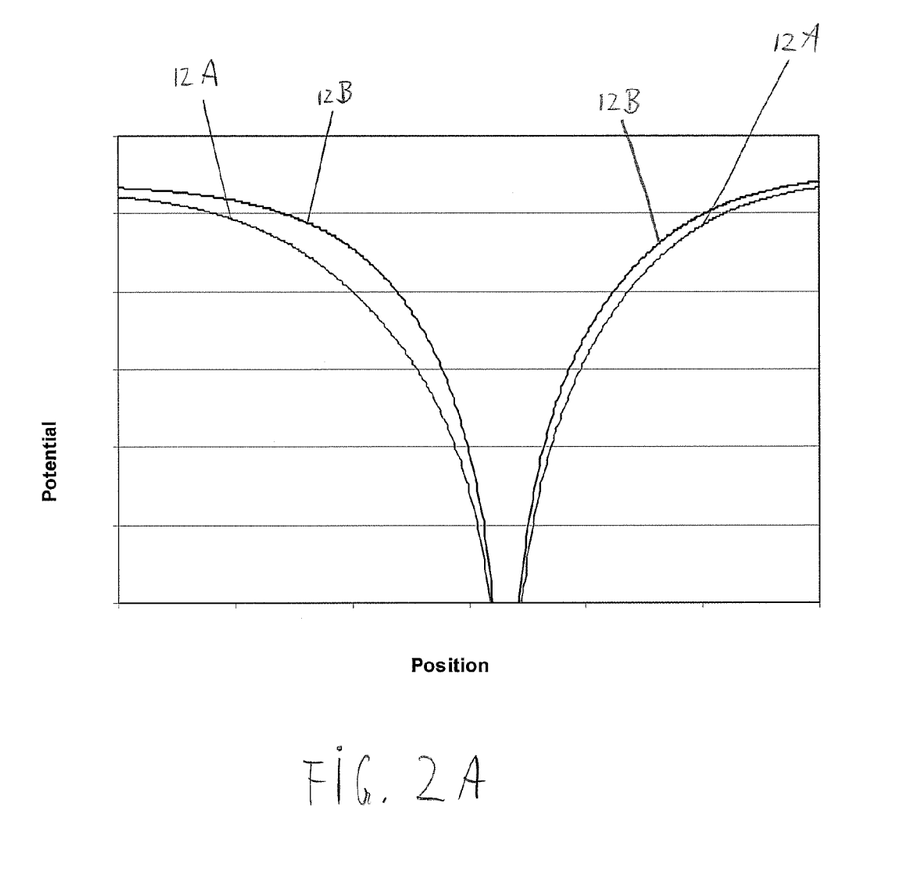
FIG. 2A shows a graph of two typical examples of a potential field along a part of the earth's surface.

FIG. 2A shows a graph of two typical examples of the potential field along the part of the earth's surface 4. Curve 12A may correspond with a situation that is comparable with FIG. 1A, and curve 12B corresponds with a situation that is comparable with FIG. 1B. Along the horizontal axis is a position along the part of the earth's surface 4, and along the vertical axis is a measure for the strength of the potential field.

Figure 2B:
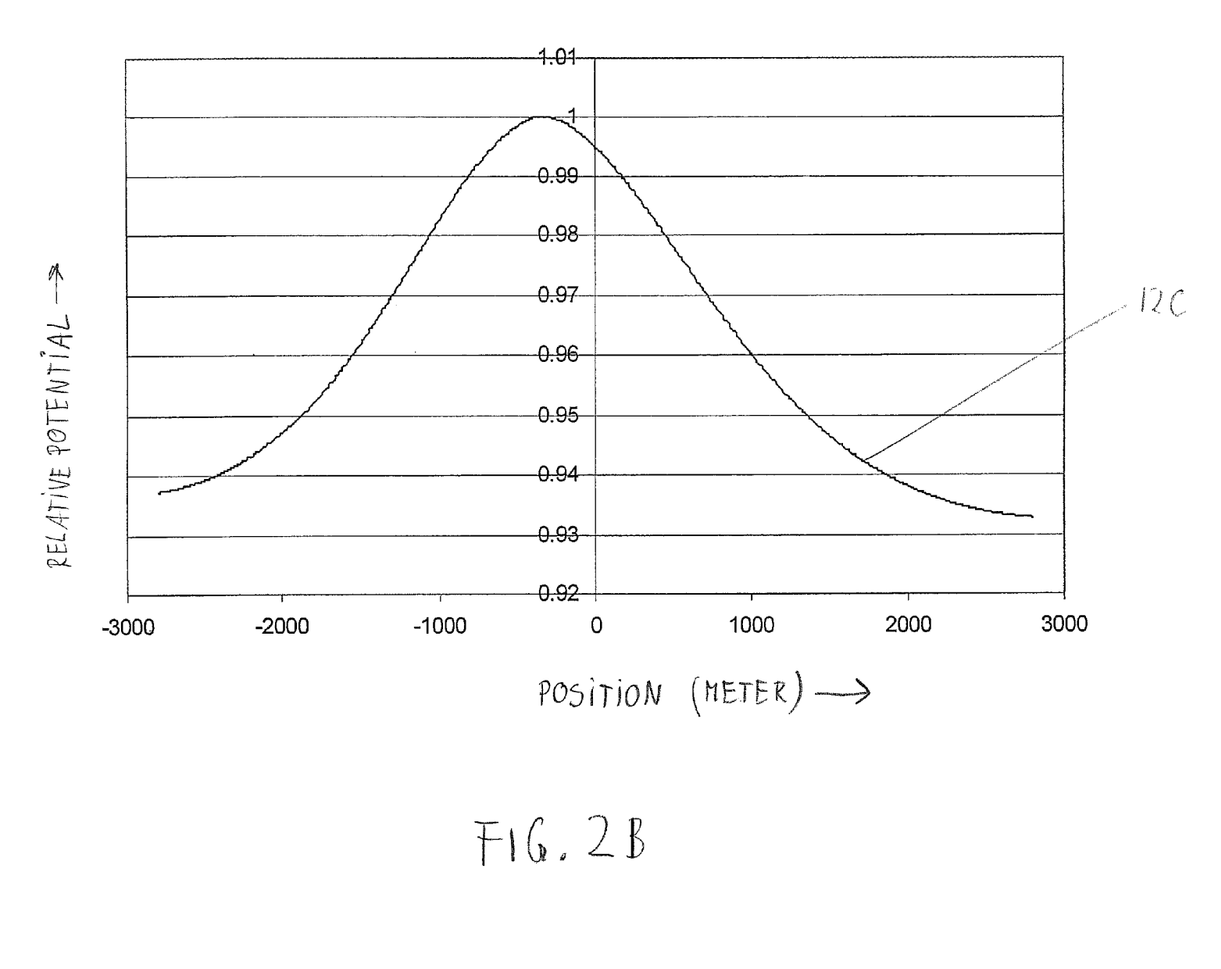
FIG. 2B shows the relative potential along a part of the earth's surface for the situation sketched in FIGS. 1A and 1B.

FIG. 2B shows the relative potential along the part of the earth's surface 4 for the situation sketched in FIGS. 1A and 1B. Along the horizontal axis is a position along the part of the earth's surface 4, and along the vertical axis is a measure for the relative strength of the potential field. The curve 12C of FIG. 2B indicates the value of the electrical potential in the situation of FIG. 1B normalised by the value of the electrical potential in the situation of FIG. 1A. The curve 12C thus indicates the relative change in potential due to the change in the extent of the hydrocarbon reservoir corresponding with the change from FIG. 1A to FIG. 1B, induced by producing the hydrocarbon reservoir 2. The top current electrode 8 in this example is located near a value of −400 meter of the position along the horizontal axis.

The first method further includes the step of inferring from the measured electrical potential an extent of the hydrocarbon reservoir, in a direction that is oriented substantially parallel to the earth's surface 2. An example of such inferring can be illustrated for a situation wherein the top current electrode 8 and the measurement electrode 10A are located near a vertical wellbore that reaches the hydrocarbon reservoir 2. In this situation, application of the current leads to the electrical potential at the position of the measurement electrode 10A. In this example, the electrical current runs through the earth from the bottom current electrode to the top current electrode. If the measured electrical potential is relatively low, it can be inferred that the lateral extent of the hydrocarbon reservoir is relatively large. In that case, the potential field along the current lines has already dropped relatively a lot. However, if the measured electrical potential is relatively high, it can be inferred that the lateral extent of the hydrocarbon reservoir is relatively small.

In a variant of the first method, inferring is further based on a position of the top current electrode, a position of the measurement electrode, and/or a position of the bottom current electrode. Taking into account one or more of these positions significantly enhances the accuracy of the method.

In another variant of the first method, the current is applied between the bottom current electrode and a first subset of the plurality of electrodes, which first subset includes the top current electrode 8. This enables optimal tuning of the potential field induced by the current for a specific reservoir. In this variant, inferring the extent of the hydrocarbon reservoir may be further based on positions of electrodes of the first subset.

For example in the situation of FIG. 1B, the bottom current electrode 6 is located under a central portion of the hydrocarbon reservoir 2. More in general, the central portion of the hydrocarbon reservoir 2 is considered to be the innermost half of the hydrocarbon reservoir 2. It may be clear that if the bottom current electrode 6 is located under the hydrocarbon reservoir 2, the hydrocarbon reservoir 2 is located over the bottom current electrode 6.

A second embodiment of a method according to the invention (further referred to as the second method), is illustrated with reference to FIGS. 3A and 3B.

FIG. 3A shows the reservoir 2, the bottom current electrode 6, the wellbore 14, and the plurality of electrodes in a cross-sectional view of a portion of the earth. An upper part G of the reservoir 2 may contain gas. A lower part O of the reservoir 2 may contain oil. Below the oil, water may be present, indicated with reference numeral W. The oil-water contact is indicated with reference numeral 15.

FIG. 3B shows the wellbore 14 and the plurality of electrodes in a top view of the part of the earth's surface 4. In FIGS. 3A and 3B, the plurality of electrodes that are spaced apart from one another along the part of the earth's surface 4, is formed by the top current electrode 8 and a second subset 10B of the plurality of electrodes that includes the measurement electrode 10A. It may be clear that the second subset 10B may contain, preferably only, further measurement electrodes that are similar to the measurement electrode 10A.

In FIG. 3B, the electrodes of the plurality of electrodes are spaced apart from one another in a grid along the part of the earth's surface 4. The grid in FIG. 3B is a regular grid pattern. However, it may be clear that other regular grid patterns, or irregular grid patterns, can also be used. More in general, a typical distance between neighbouring electrodes is in a range from 10 meter to 10000 meter, more preferably in a range between 50 meter and 1000 meter, in particular around 100 meter or around 200 meter.

The second method includes the step of applying the current between the bottom current electrode 6 and the top current electrode 8 of the plurality of electrodes that are spaced apart from one another along the part of the earth's surface 2. The second method further includes measuring a set of electrical potentials that includes the electrical potential, by means of the second subset 10B of the plurality of electrodes, which second subset 10B includes the measurement electrode 10A and the further measurement electrodes.

The second method further includes inferring from the set of measured electrical potentials the extent of the hydrocarbon reservoir 2, wherein inferring may further be based on positions of measurement electrodes of the second subset 10B.

In the second method, inferring may be based on an electrical potential map determined after an appropriate mathematical transformation from the set of measured electrical potentials and the positions of the electrodes of the second subset. Such a mathematical transformation includes interpolating between the positions of the electrodes of the second subset, and is known as such to the skilled person. Such a map may include equipotential lines, indicated with reference number 16 in FIG. 3B. These equipotential lines 3B may be obtained by interpolation between the electrical potentials measured by means of the second subset of electrodes. Suitable interpolation methods as such are known to the skilled person so that a further description is deemed superfluous. The map can be used for inferring a shape and/or size of the hydrocarbon reservoir in a plane that is oriented substantially parallel with the earth's surface. For example, an estimate of the shape and/or size of the hydrocarbon reservoir can be inferred by setting the shape and size of the reservoir equal to a shape and size of a transformed equipotential line having a specific value. This value may be determined in various ways, for example by comparing it with results from seismic inspection an/or alternative ways of monitoring the shape and/or size of the hydrocarbon reservoir. Once the specific value has been determined, it may be used for later measurements during production as well. As a result, determining the specific value is only needed once. However, it may be useful to determine it more often.

In a variation of the second method, application of the current between the bottom current electrode and the top current electrode may be repeated. For a repetition, the top current electrode was previously used as the measurement electrode. That is, for each repetition a distinct electrode of the plurality of electrodes is used as the top current electrode. In addition, measuring the electrical potentials by means of the electrodes of the second subset may be repeated. In this way tomography can be applied. Preferably, all electrodes of the plurality of electrodes are used at least once as the top current electrode.

In a third embodiment of a method according to the invention (the third method), the first method, the second method, and/or another method according to the invention may be repeated a plurality of times. The third method further includes the step of monitoring the development of the extent of the hydrocarbon reservoir in time. Monitoring in time here means monitoring the extent of the reservoir in the direction that is oriented substantially parallel with the earth's surface (i.e. the lateral extent), or the shape and/or size of the reservoir in the plane that is oriented substantially parallel with the earth's surface, at a plurality of moments in time. In this way, for example a deviation such as a bulge in the equipotential lines may be detected, indicating that oil is being trapped in the reservoir. Then, adequate measures can be taken in order to produce that oil as well, and the effect of these measures can be determined.

Monitoring in time may be based on the extents inferred in the first method, the second method, and/or the other method according to the invention. Alternatively or additionally, it may be based on changes in the electrical potentials measured by means of the measuring electrodes of the second subset. Then, the third method has the general advantage that it is relatively insensitive to irregularities in the earth that influence the potential field along the part of the earth's surface.

More in general, at least one, for example two or more than two electrodes of the second subset, of which at least one electrode is separate from the measurement electrode, may be located in a wellbore that extends from the part of the earth's surface, preferably towards the hydrocarbon reservoir. Such a placement of at least one of the electrodes of the second subset further increases the sensitivity for inferring the extent of the hydrocarbon reservoir.

It may be clear that, more in general, in FIGS. 1A, 1B, and 3A the bottom current electrode 6 and the top current electrode 8 are located at opposite sites of the hydrocarbon reservoir. This has the general advantage that the applied current is forced to flow predominantly around the reservoir. As a result, a potential field with a specific shape around the hydrocarbon reservoir is induced. This specific shape is determined by i.e. the positions of the bottom current electrode 6, by the position of the first electrode 8, and by the extent of the hydrocarbon reservoir.

One advanced way of inferring the extent of the hydrocarbon reservoir 2 in the direction that is oriented substantially parallel to the earth's surface 4, or the shape and/or size of the hydrocarbon reservoir 2 in the plane that is oriented substantially parallel to the earth's surface 4, is to carry out numerical simulations. To this end the first, second, and/or third method, and/or variations thereof, may include the step of carrying out a numerical simulation of applying the current between the bottom current electrode 6 and the top current electrode 8. The numerical simulation will yield the electrical potential, which can be considered as a numerical simulation of measuring the electrical potential. The numerical simulations may be carried out by using a geo-electrical model. This model is based on electrical properties of a first region of the earth in and around the hydrocarbon reservoir, and of a second region of the earth from the second region up to the earth's surface. Such models as such are known to the skilled person and a further description is deemed superfluous. Special about the geo-electrical model used here is that it includes at least a simulated extent of the hydrocarbon reservoir as an input parameter, and includes at least a simulated electrical potential along the simulated earth's surface as an output parameter. By using the geo-electrical model, inferring the extent of the hydrocarbon reservoir 2 may include matching the simulated electrical potential and the electrical potential measured by means of the measurement electrode 10A of the plurality of electrodes, by, optionally iterated, adapting of the simulated extent of the hydrocarbon reservoir in the numerical simulation. It may further include monitoring the extent of the hydrocarbon reservoir by determining the extent of the hydrocarbon reservoir 2 from the simulated extent of the hydrocarbon reservoir.

Applying the current as such, and measuring the electrical potential or the plurality of electrical potentials as such, may be carried out in ways known to the skilled person, so that a further description is deemed superfluous.

It is thus illustrated that the first, second, and/or third method, and/or variations thereof, can be used for monitoring the lateral extent, i.e. the extent in a direction that is oriented substantially parallel with the earth's surface, of the hydrocarbon reservoir 2 below the earth's surface. However, the invention is not limited to any embodiment herein described and, within the purview of the skilled person, modifications are possible which may be considered within the scope of the appended claims. Equally all kinematic inversions are considered inherently disclosed and to be within the scope of the present invention. The use of expressions like: "preferably", "in particular", "typically", "especially", etc. is not intended to limit the invention. The indefinite article "a" or "an" does not exclude a plurality. Features which are not specifically or explicitly described or claimed may be additionally included in the structure according to the present invention without deviating from its scope.

The invention claimed is:

1. Method of monitoring an extent of a hydrocarbon reservoir below the earth's surface, including the steps of:
  a) applying a current between a bottom current electrode and a top current electrode that is part of a plurality of electrodes that are spaced apart from one another along a part of the earth's surface located adjacent to the hydrocarbon reservoir, and above and optionally over the hydrocarbon reservoir, wherein the bottom current electrode is positioned below the hydrocarbon reservoir;
  b) measuring an electrical potential, which is caused by the current, by means of a measurement electrode that is also part of the plurality of electrodes; and
  c) inferring from the measured electrical potential the extent of the hydrocarbon reservoir, in a direction that is oriented substantially parallel with the earth's surface, wherein step a) includes applying the current between the bottom current electrode and a first subset of the plurality of electrodes, which first subset includes the top current electrode; and
  wherein inferring in step c) is further based on positions of electrodes of the first subset.

2. Method according to claim 1, wherein step b) includes measuring the electrical potential, which is caused by the current, by means of a pair of measurement electrodes.

3. Method according to claim 1, wherein inferring in step c) is further based on a position of the top current electrode, a position of the measurement electrode, and/or a position of the bottom current electrode.

4. Method according to claim 1, wherein step b) includes measuring a set of electrical potentials that includes the electrical potential, by means of a second subset of the plurality of electrodes, which second subset includes the measurement electrode, wherein step c) includes inferring from the set of measured electrical potentials the extent of the hydrocarbon reservoir.

5. Method according to claim 4, wherein at least one electrode of the second subset, which electrode is distinct from the measurement electrode, is located in a wellbore that extends from the part of the earth's surface, preferably towards the hydrocarbon reservoir.

6. Method according to claim 4, wherein inferring in step c) is further based on positions of electrodes of the second subset.

7. Method according to claim 6, wherein inferring in step c) is based on an electrical potential map determined from the set of measured electrical potentials and the positions of the electrodes of the second subset.

8. Method according to claim 1, including the step of:
  d) repeating steps a) and b), wherein the top current electrode during a repetition of steps a) and b) was previously used as the measurement electrode;
  wherein inferring in step c) is based on the electrical potentials measured in steps b).

9. Method according to claim 8, wherein steps a) and b) are repeated until all electrodes of the plurality of electrodes are used at least once as the top current electrode.

10. Method according to claim 1, wherein the measurement electrode is located over an edge region of the hydrocarbon reservoir.

11. Method according to claim 1, wherein the bottom current electrode is located under a central portion of the hydrocarbon reservoir.

12. Method according to claim 1, the bottom current electrode and the top current electrode are located at opposite sides of the hydrocarbon reservoir.

13. Method according to claim 1, further including the step of:
  e) carrying out a numerical simulation of steps a) and b) by using a geo-electrical model, which is based on electrical properties of a first region of the earth in and around the hydrocarbon reservoir, and of a second region of the earth from the second region up to the earth's surface, wherein the geo-electrical model includes at least a simulated extent of the hydrocarbon reservoir as an input parameter, and includes at least a simulated electrical potential along the simulated earth's surface as an output parameter;
  wherein inferring in step c) includes matching the simulated electrical potential and the electrical potential measured in step b), by, optionally iterated, adapting of the simulated extent of the hydrocarbon reservoir in the numerical simulation, and further includes determining the extent of the hydrocarbon reservoir from the simulated extent of the hydrocarbon reservoir.

14. Method according to claim 1, including carrying out the combination of steps a) and b) a plurality of times, further including the step:
  f) monitoring the development of the extent of the hydrocarbon reservoir in time.

15. Method according to claim 14, including carrying out the combination of steps a), b), and c) a plurality of times, wherein monitoring in time in step f) is based on the extents inferred in steps c).

16. Method according to claim 8, further including carrying out step d) before step c) each time step c) is carried out.

17. Method according to claim 1, wherein the plurality of electrodes are spaced apart from one another in a grid along the part of the earth's surface.

* * * * *

UNITED STATES PATENT AND TRADEMARK OFFICE
CERTIFICATE OF CORRECTION

PATENT NO.         : 8,598,882 B2                                                    Page 1 of 1
APPLICATION NO. : 13/321393
DATED              : December 3, 2013
INVENTOR(S)        : Jozef Antonius Chrysostomus Meekes It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 209 days.

Signed and Sealed this
Twenty-second Day of September, 2015

Michelle K. Lee
*Director of the United States Patent and Trademark Office*